(12) United States Patent
Okamura

(10) Patent No.: US 6,657,672 B1
(45) Date of Patent: Dec. 2, 2003

(54) FLASH DEVICE, CONTROL METHOD AND CONTROL APPARATUS FOR THE SAME, AND IMAGE PICKUP APPARATUS

(75) Inventor: Satoshi Okamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/368,877

(22) Filed: Aug. 5, 1999

(30) Foreign Application Priority Data

Aug. 19, 1998 (JP) .......................................... 10-232877

(51) Int. Cl.[7] .......................... H04N 5/222; G03B 15/03
(52) U.S. Cl. ........................ 348/371; 348/370; 396/159
(58) Field of Search ................................. 396/159, 155, 396/173, 180, 182; 348/370, 371

(56) References Cited

U.S. PATENT DOCUMENTS

| | | | | | |
|---|---|---|---|---|---|
| 4,297,011 A | * | 10/1981 | Adams, Jr. | .................. | 396/159 |
| 4,985,725 A | * | 1/1991 | Serikawa | .................... | 396/159 |
| 5,752,103 A | * | 5/1998 | Nishida | ....................... | 396/173 |
| 5,956,535 A | * | 9/1999 | Tohyama | .................... | 396/159 |
| 6,151,073 A | * | 11/2000 | Steinberg et al. | .......... | 348/371 |

* cited by examiner

*Primary Examiner*—Wendy R. Garber
*Assistant Examiner*—Rashawn N. Tillery
(74) *Attorney, Agent, or Firm*—Robin, Blecker & Daley

(57) ABSTRACT

In a flash device, a control method for the flash device, an image pickup apparatus using the flash device, and a control apparatus for the flash device, when causing a light emitting portion to make light emission n times (n being a predetermined integer not less than 2), an amount of light emission of the light emitting portion for each of the n times is controlled so as to be set to an amount of light emission corresponding to a voltage level which is one (n−1)-th of a result obtained by subtracting a light-emission enabling reference voltage level of the light emitting portion from a charging voltage level of a capacitor which supplies light-emission energy to the light emitting portion.

16 Claims, 7 Drawing Sheets

FLASH DEVICE, CONTROL METHOD AND CONTROL APPARATUS FOR THE SAME, AND IMAGE PICKUP APPARATUS

BACKGROUND OF THE INVENTION

1. Field of the Invention

The present invention relates to a flash device for illuminating an object of shooting, a control method and a control apparatus for the flash device, and an image pickup apparatus, such as an electronic still camera, which uses the flash device.

2. Description of Related Art

In a case where a CCD of the all-pixel-reading type is employed as an image sensor in taking a picture by using a flash device, one still image can be recorded by emitting light once during a period of accumulating electric charge for one field. A continuous shooting also can be accomplished by continuously recording still images with one field used as the unit of shooting and by emitting light a plurality of times in synchronism with the continuous recording.

On the other hand, if a still image is to be recorded to have an excellent vertical resolution with a CCD of the field reading type employed as an image sensor, such recording is possible by using video signals for two continuous fields. For this purpose, light emission must be made twice for the two continuous field in synchronism with each field. In addition to that, it is necessary to control the amount of light emission in such a way as to make the amount of light emission for one field equal to the amount of light emission for the other field.

A conventional method for controlling the amount of light emission is described below with reference to FIGS. 5 and 6.

Figure 5:
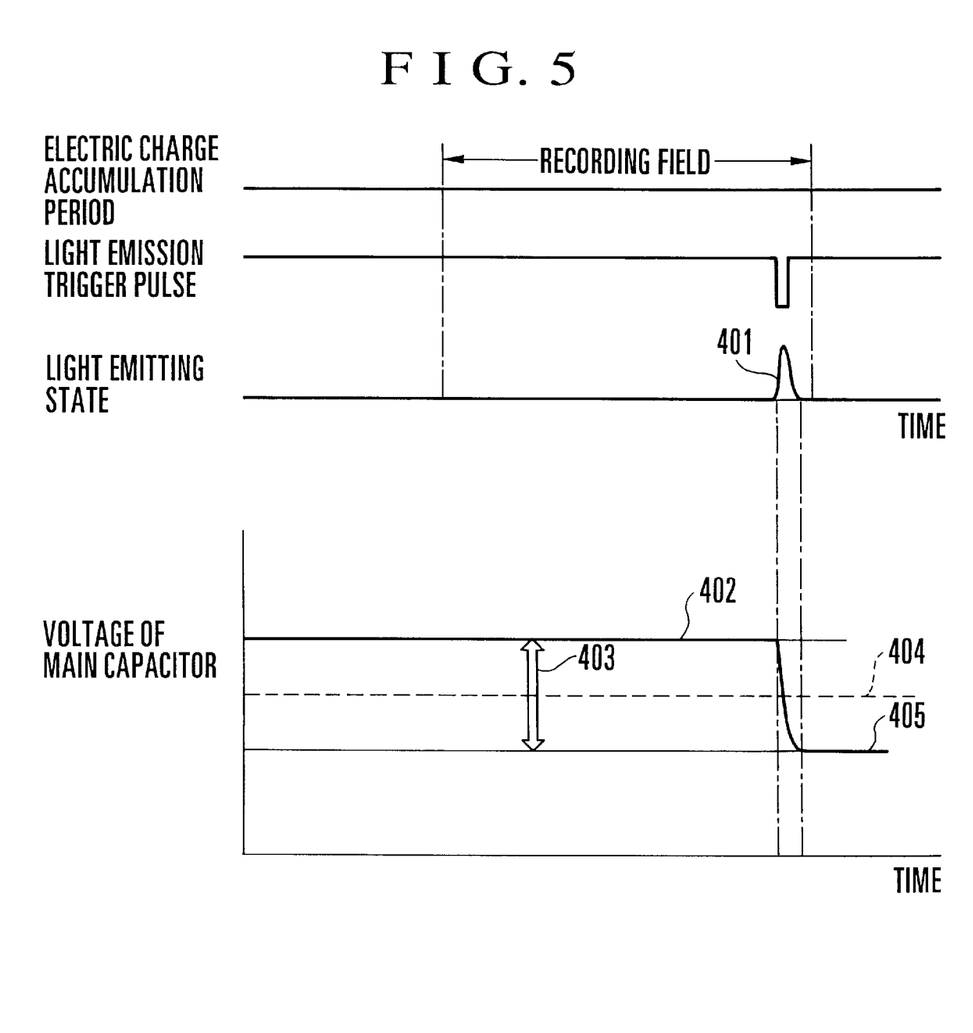
FIG. 5 is a diagram for explaining a conventional control method for the amount of light emission as applied to a case where light emission is to be made once.

FIG. 5 is a diagram for explaining changes taking place in voltage of a main capacitor of a flash device when the flash device is allowed to emit light once in synchronism with a field of recording by an electronic still camera. In FIG. 5, reference numeral 401 denotes a waveform of light emission by the flash device, reference numeral 402 denotes a charging voltage of the main capacitor obtained before light emission, reference numeral 403 denotes a voltage which corresponds to the amount of light emission, reference numeral 404 denotes a voltage at which light emission becomes possible (hereinafter referred to as a light-emission enabling voltage), and reference numeral 405 denotes a charging voltage of the main capacitor obtained after light emission. A maximum amount of light emission is set as an upper limit of light emission amount for control to be accomplished over the amount of light emission by considering the charging voltage of the main capacitor. A light emission amount at which an apposite exposure can be obtained is compared with the maximum light emission amount, and an amount of light emission to be made by the flash device is controlled so as not to exceed the maximum light emission amount according to the result of comparison.

In a case where the light emission is required only once, the maximum light emission amount is set at a light emission amount corresponding to the charging voltage of the main capacitor obtained before light emission. At that time, if a light emission amount required for an apposite exposure is found to be larger than the maximum light emission amount, an amount of light emission is corrected so as to be set to the maximum light emission amount. Then, light emission is possible so long as the charging voltage 402 before light emission is larger than the light-emission enabling voltage 404.

Figure 6:
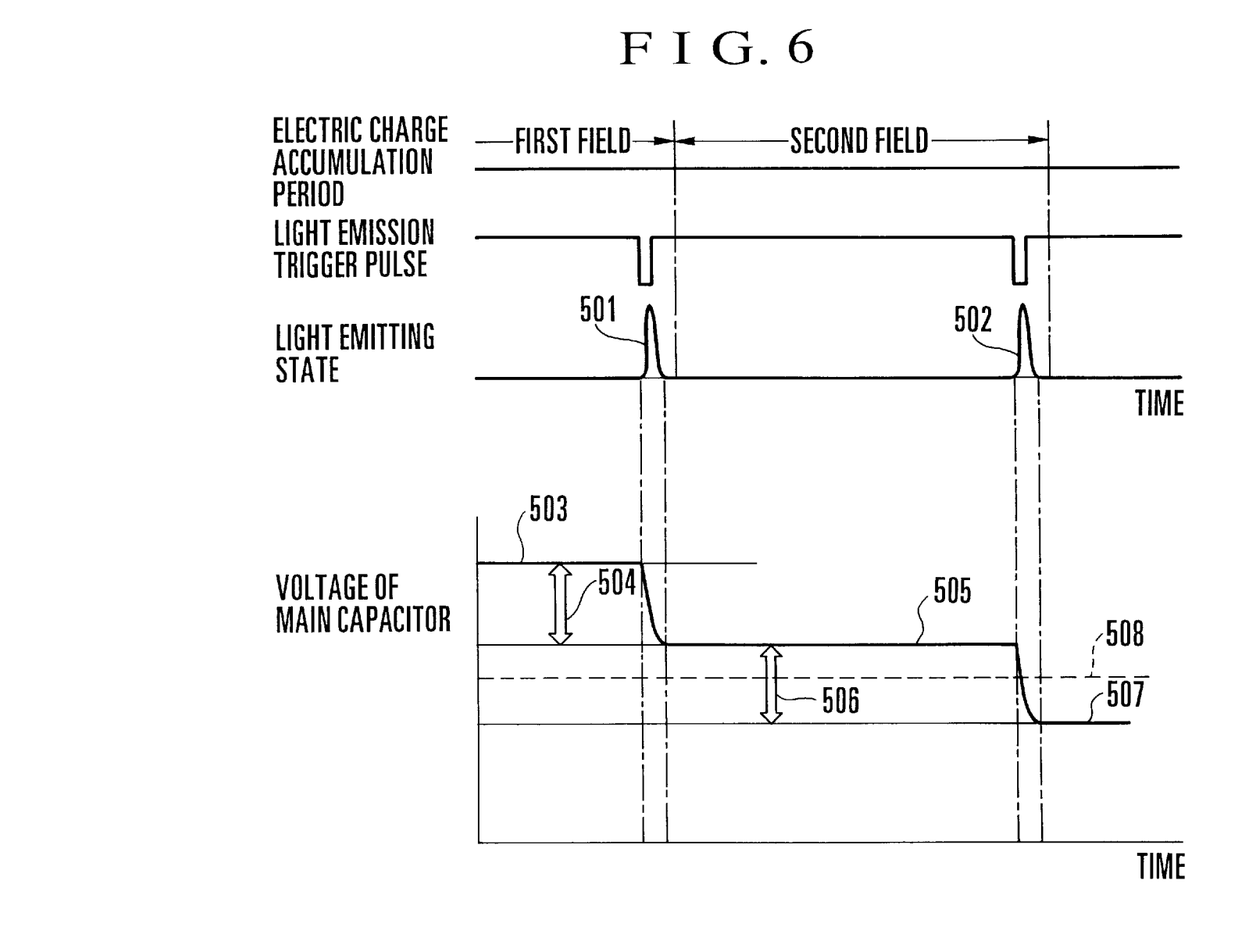
FIG. 6 is a diagram for explaining the conventional control method for the amount of light emission as applied to a case where light emission is to be made twice.

FIG. 6 shows the control of the amount of light emission and the change in voltage of the main capacitor in a case where light emission is made continuously for two fields by a system similar to the system in FIG. 5. In the case of FIG. 6, the change of voltage is assumed to take place either in a case where a continuous shooting operation is performed in synchronism with fields by an electronic still camera using a CCD of the all-pixel reading type or where a still picture is taken by an electronic still camera using a CCD of the field reading type.

In FIG. 6, reference numeral 501 denotes a waveform of light emission for a first field, reference numeral 502 denotes a waveform of light emission for a second field, reference numeral 503 denotes a charging voltage obtained before light emission for the first field, reference numeral 504 denotes a voltage which corresponds to the amount of light emission for the first field, reference numeral 505 denotes a charging voltage before light emission for the second field, reference numeral 506 denotes a voltage which corresponds to the amount of light emission for the second field, reference numeral 507 denotes a charging voltage obtained after light emission for the second field, and reference numeral 508 denotes a light-emission enabling voltage. The voltage 504 corresponding to the amount of light emission for the first field and the voltage 506 corresponding to the amount of light emission for the second field are equal to each other.

In the case of the continuous light emission, the maximum light emission amount is set at a value obtained by dividing the light emission amount which corresponds to the charging voltage 503 before light emission by the number of times of light emission. Then, like in the case of the single (one-time) light emission, a light emission amount required for an apposite exposure is compared with the maximum light emission amount, and an amount of light emission to be made by the flash device is then controlled so as not to exceed the maximum light emission amount according to the result of comparison.

After the light emission for the first field, the voltage of the main capacitor of the flash device obtained before the light emission for the first field drops from the charging voltage 503 as much as the voltage 504 corresponding to the light emission amount, thereby becoming the charging voltage 505. Since the light emission amount for one field is arranged to be equal to the light emission amount for the other field, the charging voltage drops also after the light emission for the second field as much as the voltage 506 corresponding to the light emission amount for the second field. When the continuous light emission comes to an end, the charging voltage of the main capacitor thus changes to the charging voltage 507.

Figure 7:
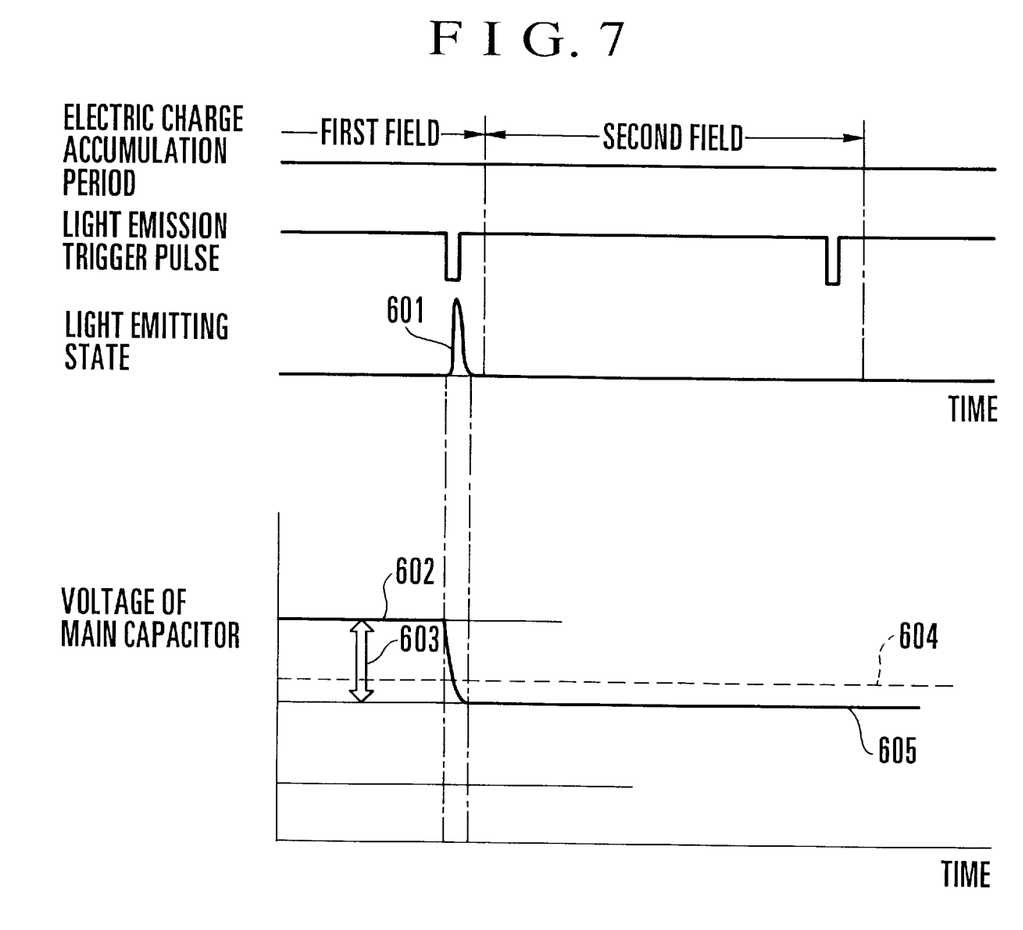
FIG. 7 is a diagram for explaining a problem with the conventional control method for the amount of light emission.

However, in cases where the charging voltage of the main capacitor before light emission is sufficiently large and the light emission amount required for an apposite exposure is extremely large, or where light emission is to be made immediately after the charging voltage of the main capacitor comes to exceed a light-emission enabling voltage, in carrying out the continuous light emission under the conventional flash light emission amount control mentioned above, the light emission for the first field in a waveform 601 causes the charging voltage of the main capacitor to drop to a charging voltage 605 which is lower than a light-emission enabling voltage 604, as shown in FIG. 7. In such a case, further light emission is inhibited by a flash light emission control circuit even if a light emission trigger pulse is outputted for the second field. The continuous light emission then hardly can be carried out for a predetermined number of times.

Under such a condition, in the case of the system using a CCD of the field reading type, the luminance of an image recorded for the second field greatly differs from that of an image recorded for the first field, so that flicker occurs in a recorded still image, thereby deteriorating the image quality to an excessive degree. This has presented a serious problem.

BRIEF SUMMARY OF THE INVENTION

In accordance with one aspect of the invention, there are provided a flash device in which, in causing a light emitting portion to make light emission n times (n being a predetermined integer not less than 2), an amount of light emission of the light emitting portion for each of the n times is so controlled as to be set to an amount of light emission corresponding to a voltage level which is one (n−1)-th of a result obtained by subtracting a light-emission enabling reference voltage level of the light emitting portion from a charging voltage level of a capacitor which supplies light-emission energy to the light emitting portion, so that the light emission for the predetermined n times can be securely performed, a control method for the flash device, an image pickup apparatus using the flash device, and a control apparatus for the flash device.

The above and further aspects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
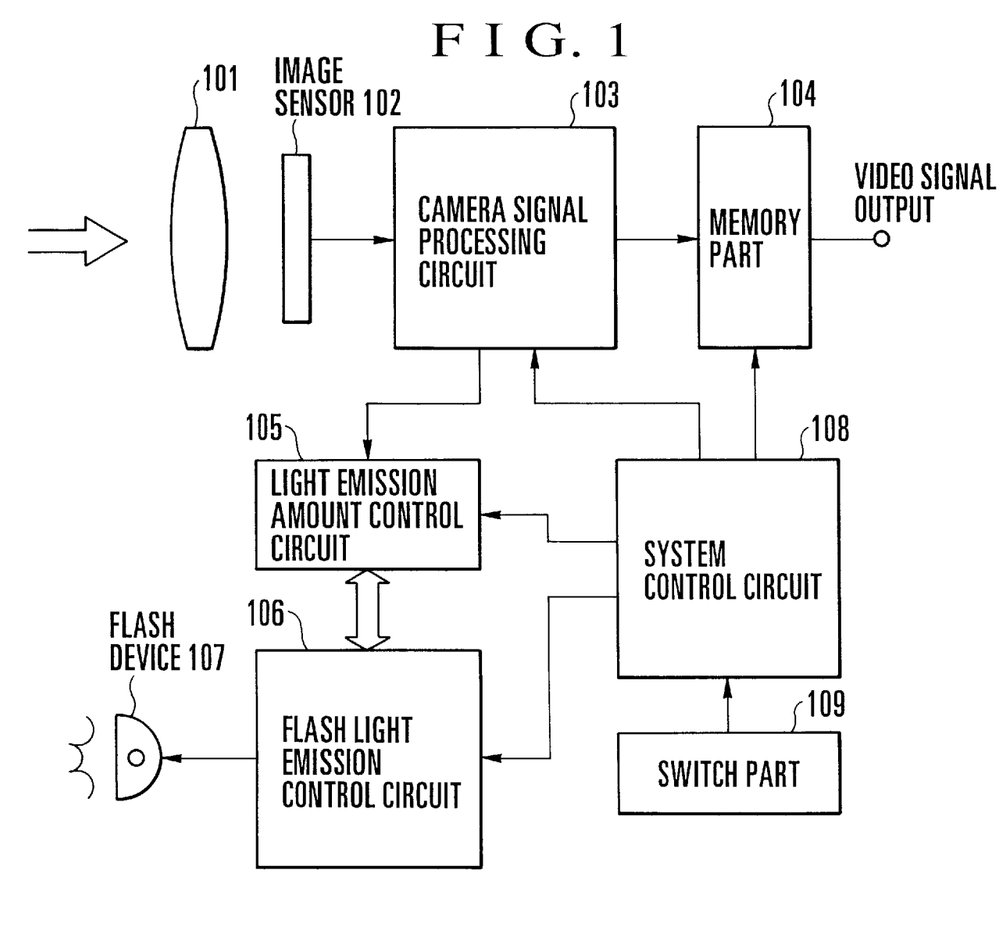
FIG. 1 is a block diagram showing the circuit arrangement of an electronic still camera according to each embodiment of the invention.

FIG. 1 is a block diagram showing the circuit arrangement of an electronic still camera according to each embodiment of the invention. Referring to FIG. 1, the electronic still camera includes a lens 101 for forming an image, a CCD 102 arranged as an image sensor to photoelectrically convert light incident thereon into an electrical signal, a camera signal processing circuit 103 arranged to form luminance and chrominance signals from the electrical signal formed by the image sensor 102, a memory part 104 arranged to store a video signal outputted from the camera signal processing circuit 103, a flash device (light emission means) 107 arranged to be caused to emit light by electric discharge of a main capacitor (not shown), a flash light emission control circuit 106 (light emission control means) arranged to control the light emitting action of the flash device 107, a light emission amount control circuit 105 (light emission amount control means) arranged to compute an amount of light emission to be made by the flash device 107 and to control the amount of light emission according to the result of computation, a switch part 109 arranged to be externally operable to give an instruction for recording a still image and an instruction for the number of times of image pickup operations of the continuous shooting, and a system control circuit 108 arranged to give instructions to each applicable part according to an input from the switch part 109.

Light from an object of shooting is imaged on the CCD 102 through the lens 101. The optical image thus formed on the CCD 102 is photoelectrically converted into an electrical signal. The electrical signal is processed by the camera signal processing circuit 103 into a video signal. The video signal thus formed is outputted through the memory part 104.

The flash light emission control circuit 106 sends information on the charging voltage of the main capacitor to the light emission amount control circuit 105. Further, upon receipt of an instruction for starting light emission, the flash light emission control circuit 106 also controls the starting and stopping of the light emission of the flash device 107. The light emission is arranged to begin in synchronism with a light emission trigger pulse and to come to an end within an electric charge accumulation period. If the charging voltage of the main capacitor is less than a light-emission enabling voltage, the light emission is inhibited despite of the instruction for starting light emission. In such a case, taking a shot may be inhibited, for example, by rendering the switch part 109 no longer pushable. The light emission amount control circuit 105 computes a light emission amount required for an apposite exposure, for example, from information on the object luminance signal obtained by the camera signal processing circuit 103. In recording a still image, a signal of a still image recording trigger switch is sent from the switch part 109 to the system control circuit 108. In response to this signal, the system control circuit 108 sends a still image recording start signal to the camera signal processing circuit 103, the memory part 104, the light emission amount control circuit 105 and the flash light emission control circuit 106. In this instance, the system control circuit 108 also provides the memory part 104 with number-of-recording-fields information indicative of a desired number of recording fields to instruct the memory part 104 to record still images for the desired number of fields.

Upon receipt of the still image recording start signal from the system control circuit 108, the camera signal processing circuit 103 sends information on the object such as luminance information to the light emission amount control circuit 105. The light emission amount control circuit 105 then computes a light emission amount required for an apposite exposure in synchronism with the still image recording start signal and sends light emission amount data to the flash light emission control circuit 106. The flash light emission control circuit 106 then outputs a light emission trigger pulse in synchronism with the still image recording to cause the flash device 107 to emit light a predetermined number of times indicated by the number-of-recording-fields information and in a predetermined amount of light emission indicated by the light emission amount data. Further, the flash light emission control circuit 106, which detects the charging voltage of the main capacitor, allows the flash device 107 to emit light if the charging voltage is larger than the light-emission enabling voltage, and inhibits the flash device 107 from emitting light, despite of the light emission trigger pulse, if the charging voltage is less than the light-emission enabling voltage.

In synchronism with the still image recording start signal, the memory part 104 records just an amount of the video signal corresponding to the number of fields designated by the number-of-recording-fields information and then outputs still images.

With the electronic still camera arranged as described above, the light emission amount control circuit 105 sets the upper limit of light emission amount to an amount according (corresponding) to the charging voltage level of the main capacitor if the number of times of light emission is one, and, if the number of times of light emission is "n" ("n" being a positive integer not less than "2") (i.e., during the continuous light emission), sets the upper limit of light emission amount to an amount according (corresponding) to a voltage which is one (n−1)-th times as much as a result obtained by subtracting a light-emission enabling voltage level (reference voltage level) from the charging voltage level of the main capacitor.

A method for the amount of light emission according to a first embodiment of the invention is described in detail below with reference to FIG. 2. In the case of the first embodiment, a CCD of the field reading type is employed as the image sensor.

Figure 2:
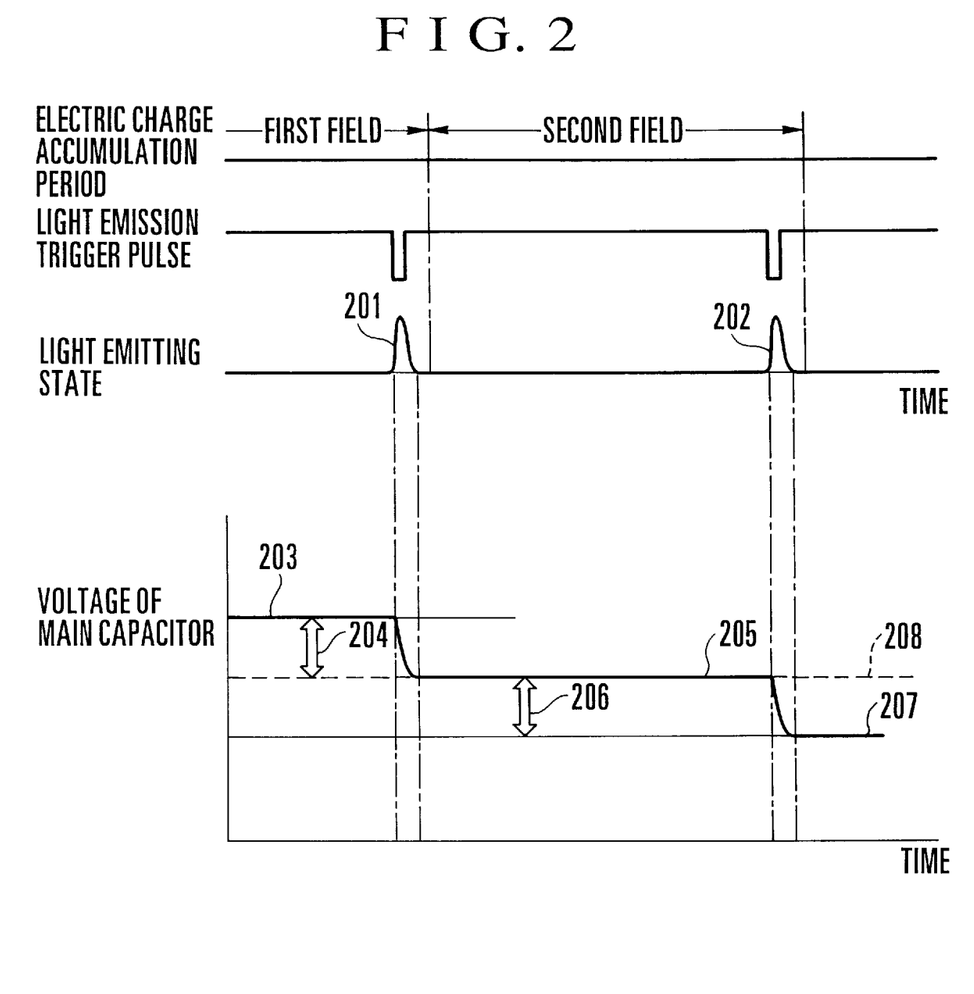
FIG. 2 is a diagram for explaining a control method for the amount of light emission according to a first embodiment of the invention.

In FIG. 2, reference numeral 201 denotes a waveform of light emission for a first field, reference numeral 202 denotes a waveform of light emission for a second field, reference numeral 203 denotes a charging voltage of the main capacitor obtained before the light emission for the first field, reference numeral 205 denotes a charging voltage of the main capacitor obtained before the light emission for the second field, reference numeral 208 denotes a light-emission enabling voltage, reference numeral 204 denotes a difference voltage between the charging voltage 203 before the light emission for the first field and the light-emission enabling voltage 208, reference numeral 207 denotes a charging voltage of the main capacitor obtained after the light emission for the second field, and reference numeral 206 denotes a difference voltage between the light-emission enabling voltage 208 and the charging voltage 207 after the light emission for the second field. These charging voltages are obtained by the flash light emission control circuit 106. A light emission amount required for an apposite exposure for one field is equal to the amount for another field.

In order to carry out the control of the amount of light emission while taking the charging voltage into consideration, a maximum light emission amount which is an upper limit of the allowable amount of light emission is preset by a computing operation as mentioned in the foregoing. The maximum light emission amount is compared with the light emission amount for an apposite exposure. If the light emission amount for an apposite exposure is larger than the maximum light emission amount, an actual light emission amount to be designated by instructing the flash device 107 is changed to the maximum light emission amount.

In the case of the first embodiment, the maximum light emission amount is set to an amount corresponding to the difference voltage 204 between the charging voltage 203 before light emission and the light-emission enabling voltage 208. Even if the light emission amount to be designated by instructing the flash device 107 is changed to the maximum light emission amount, with the light emission amount for an apposite exposure found to be larger than the maximum light emission amount, it is ensured that the charging voltage 205 after light emission for the first field never becomes lower than the light-emission enabling voltage 208, even when the voltage is lowered by the light emission for the first field, so that the charging voltage immediately before the light emission for the second field is always not lower than the light-emission enabling voltage 208, and, therefore, the light emission for the second field can be made without fail.

Next, a control method for the amount of light emission according to a second embodiment of the invention is described in detail below with reference to FIG. 3. The arrangement of the electronic still camera of the second embodiment is the same as that of the first embodiment. In the case of the second embodiment, however, a CCD of the all-pixel reading type is employed as the image sensor.

Figure 3:
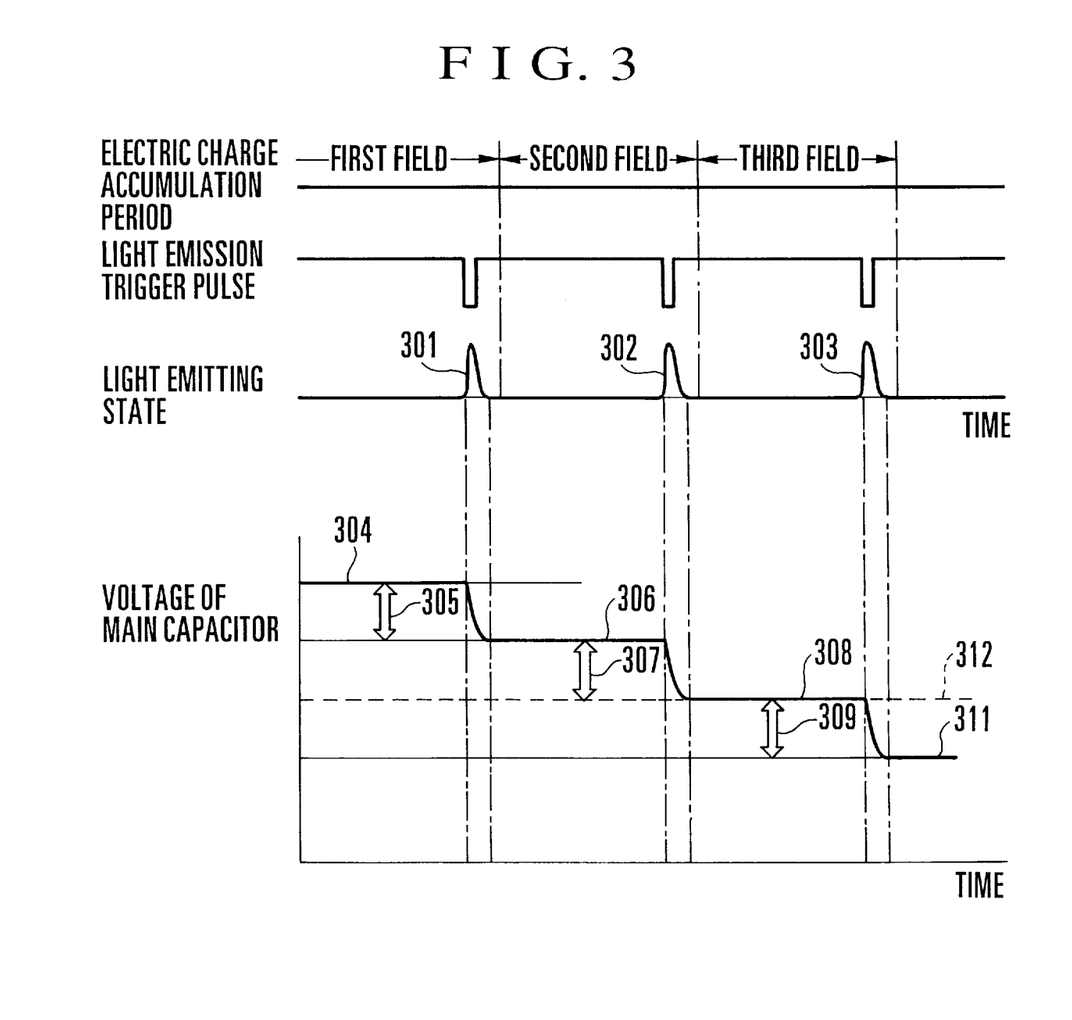
FIG. 3 is a diagram for explaining a control method for the amount of light emission according to a second embodiment of the invention.

In FIG. 3, reference numeral 301 denotes a waveform of light emission for a first field, reference numeral 302 denotes a waveform of light emission for a second field, reference numeral 303 denotes a waveform of light emission for a third field, reference numeral 304 denotes a charging voltage of the main capacitor obtained before light emission for the first field, reference numeral 306 denotes a charging voltage of the main capacitor obtained before light emission for the second field, reference numeral 308 denotes a charging voltage of the main capacitor obtained before light emission for the third field, reference numeral 312 denotes a light-emission enabling voltage, reference numeral 305 denotes a difference voltage between the charging voltage 304 before light emission for the first field and the charging voltage 306 before light emission for the second field, reference numeral 307 denotes a difference voltage between the charging voltage 306 before light emission for the second field and the light-emission enabling voltage 312, reference numeral 309 denotes a difference voltage between the charging voltage 308 before light emission for the third field (light-emission enabling voltage 312) and a charging voltage 311 obtained after light emission for the third field. These charging voltages are obtained from the flash light emission control circuit 106. In the case of the second embodiment, a continuous shooting operation is performed in synchronism with the first, second and third fields. The light emission amount for an apposite exposure is arranged to be the same for each of these fields.

In order to carry out the control of the amount of light emission while taking the charging voltage of the main capacitor into consideration, a maximum light emission amount which is the upper limit of light emission amount is preset by carrying out a computing operation in the same manner as in the case of the first embodiment. The maximum light emission amount is compared with a light emission amount required for an apposite exposure. If the light emission amount for an apposite exposure is found to be larger than the maximum light emission amount, a light emission amount to be designated by instructing the flash device 107 is changed to the maximum light emission amount.

In the second embodiment, the maximum light emission amount is set to a light emission amount corresponding to a result obtained by dividing a difference voltage between the charging voltage 304 before light emission for the first field and the light-emission enabling voltage 312 by a value which is "the number of times of light emission −1". This method ensures that the charging voltage 308 before light emission for the third field never becomes less than the light-emission enabling voltage 312 even after the voltage of the main capacitor has been caused to drop by the light emission made for the first and second fields. Since the charging voltage obtained immediately before light emission for the third field is thus arranged to always become higher than the light-emission enabling voltage 312, the light emission for the third field can be made without fail.

A control operation for the amount of light emission to be performed by each of the first and second embodiments is described below with reference to the flow chart of FIG. 4. The control operation is executed by a CPU (not shown) on the basis of a program stored in a ROM (not shown).

Figure 4:
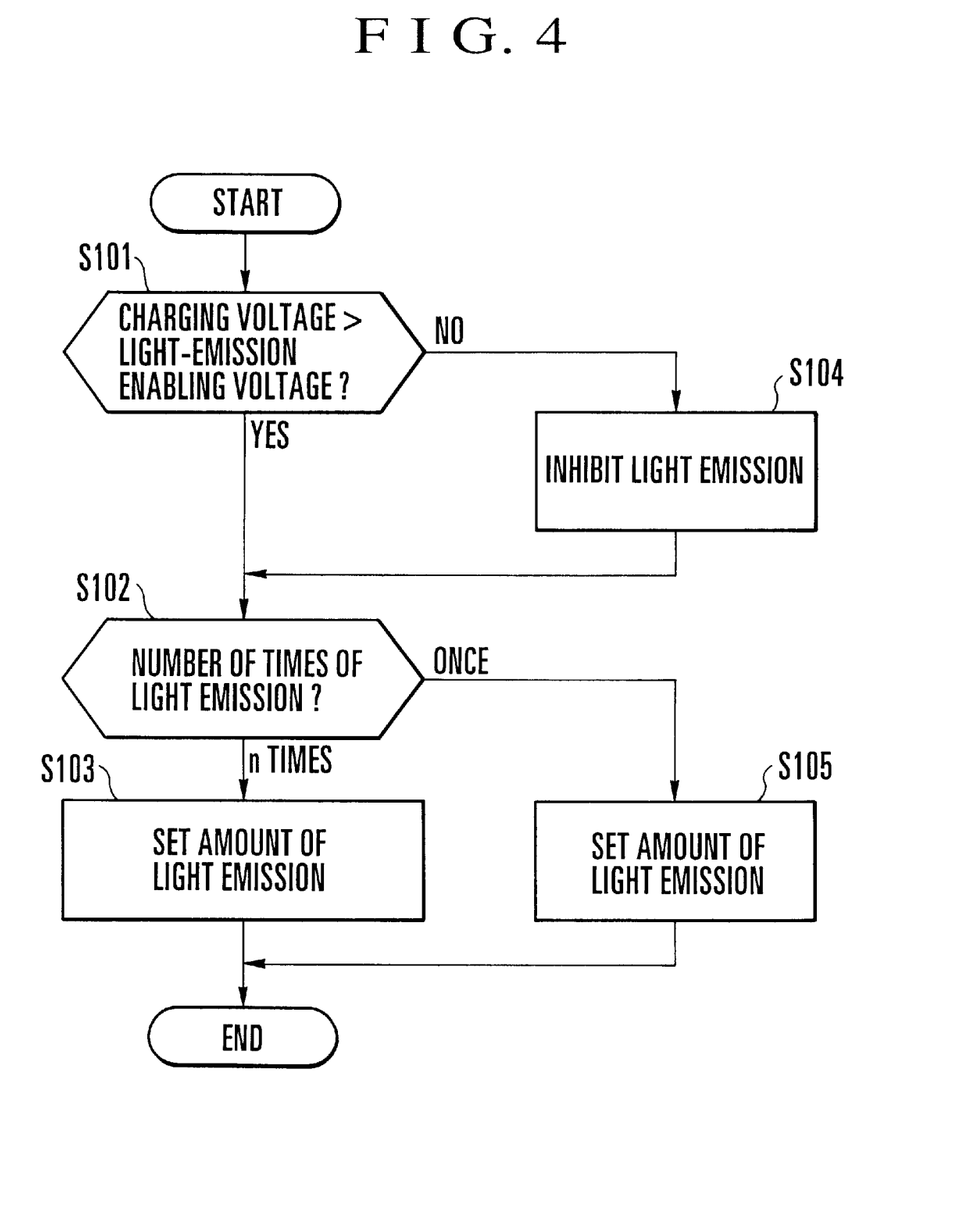
FIG. 4 is a flow chart showing a control operation for the amount of light emission according to each of the first and second embodiments of the invention.

Referring to FIG. 4, in step S101, a check is made to find if the charging voltage of the main capacitor is above the light-emission enabling voltage. If so, the flow of operation proceeds to a step S102. If the charging voltage of the main capacitor is found to be lower than the light-emission enabling voltage, the flow proceeds to a step S104 to inhibit light emission.

In the next step S102, a check is made for the number of times of light emission. If the number of times of light emission is found to be one, the flow proceeds to a step S105 to set an upper limit of light emission amount according to the charging voltage. If the number of times of light emission is found to be "n"times ("n" being a positive integer not less than "2"), the flow proceeds to a step S103. In step S103, an upper limit of the light emission amount is set to an amount corresponding to a voltage which is one (n−1)-th times as much as a result obtained by subtracting the light-emission enabling voltage from the charging voltage of the main capacitor.

The first embodiment, which is applicable to an electronic still camera using a CCD of the field reading type, is arranged to control the flash device in synchronism with fields in such a way as to prevent the light emission from terminating after completion of light emission only for the first field in a case where two continuous field signals are necessary for a still image. Therefore, in such a case, the first embodiment effectively prevents the still image from flickering.

The second embodiment, which is applicable to an electronic still camera using a CCD of the all-pixel-reading type, is arranged to control the flash device in such a way as to prevent the light emission for a plurality of fields from prematurely terminating before completion of light emission for a predetermined number of times in a case where the light emission is required to be made a predetermined number of times, for continuously picking up still images by taking each field as the unit of the light emission.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Further, the software arrangement and the hardware arrangement in each of the embodiments may be adaptively replaced with each other.

Further, in the invention, the embodiments described above or the technical elements thereof may be combined with each other according to necessity.

Further, the invention also applies to cases where each claim or the whole or a part of the arrangement of each of the embodiments constitutes one apparatus or is used in combination with another apparatus or as a component element of an apparatus.

Further, the invention is also applicable to various types of cameras, such as an electronic still camera, a video camera and a camera using a silver-halide film, various image pickup apparatuses other than cameras, various optical apparatuses and other types of apparatuses, and, moreover, to apparatuses adapted for the cameras, the image pickup apparatuses, optical apparatuses and the other types of apparatuses, and elements constituting the above-mentioned apparatuses.

What is claimed is:

1. A flash device comprising:
   (A) a light emitting portion;
   (B) a capacitor which supplies light-emission energy to said light emitting portion; and
   (C) a control device which, in causing said light emitting portion to make light emission n times (n being a predetermined integer not less than 2), controls an amount of light emission of said light emitting portion for each of the n times so as to be set to an amount of light emission corresponding to a voltage level which is one (n−1)-th of a result obtained by subtracting a light-emission enabling reference voltage level of said light emitting portion from a charging voltage level of said capacitor.

2. A flash device according to claim 1, wherein, in causing said light emitting portion to make light emission one time, said control device controls an amount of light emission of said light emitting portion so as to be set to an amount of light emission corresponding to a charging voltage level of said capacitor.

3. A flash device according to claim 1, wherein said control device causes light-emission timing of said light emitting portion to synchronize with a video signal of field unit.

4. A flash device according to claim 1, wherein said control device causes said light emitting portion to make light emission two times while causing light-emission timing of said light emitting portion to synchronize with a video signal of field unit.

5. A control method for a flash device, comprising the step of:
   in causing a light emitting portion to make light emission n times (n being a predetermined integer not less than 2), controlling an amount of light emission of said light emitting portion for each of the n times so as to be set to an amount of light emission corresponding to a voltage level which is one (n−1)-th of a result obtained by subtracting a light-emission enabling reference voltage level of said light emitting portion from a charging voltage level of a capacitor which supplies light-emission energy to said light emitting portion.

6. A control method according to claim 5, further comprising the step of:
   in causing said light emitting portion to make light emission one time, controlling an amount of light emission of said light emitting portion so as to be set to an amount of light emission corresponding to a charging voltage level of said capacitor.

7. A control method according to claim 5, further comprising the step of:
causing light-emission timing of said light emitting portion to synchronize with a video signal of field unit.

8. A control method according to claim 5, further comprising the step of:
causing said light emitting portion to make light emission two times while causing light-emission timing of said light emitting portion to synchronize with a video signal of field unit.

9. An image pickup apparatus using a flash device having a light emitting portion and a capacitor which supplies light-emission energy to said light emitting portion, said image pickup apparatus comprising:
a control device which, in causing said light emitting portion to make light emission n times (n being a predetermined integer not less than 2), controls an amount of light emission of said light emitting portion for each of the n times so as to be set to an amount of light emission corresponding to a voltage level which is one (n–1)-th of a result obtained by subtracting a light-emission enabling reference voltage level of said light emitting portion from a charging voltage level of said capacitor.

10. An image pickup apparatus according to claim 9, wherein, in causing said light emitting portion to make light emission one time, said control device controls an amount of light emission of said light emitting portion so as to be set to an amount of light emission corresponding to a charging voltage level of said capacitor.

11. An image pickup apparatus according to claim 9, wherein said control device causes light-emission timing of said light emitting portion to synchronize with a video signal of field unit.

12. An image pickup apparatus according to claim 9, wherein said control device causes said light emitting portion to make light emission two times while causing light-emission timing of said light emitting portion to synchronize with a video signal of field unit.

13. A control apparatus for a flash device having a light emitting portion and a capacitor which supplies light-emission energy to said light emitting portion, said control apparatus comprising:
a control device which, in causing said light emitting portion to make light emission n times (n being a predetermined integer not less than 2), controls an amount of light emission of said light emitting portion for each of the n times so as to be set to an amount of light emission corresponding to a voltage level which is one (n–1)-th of a result obtained by subtracting a light-emission enabling reference voltage level of said light emitting portion from a charging voltage level of said capacitor.

14. A control apparatus according to claim 13, wherein, in causing said light emitting portion to make light emission one time, said control device controls an amount of light emission of said light emitting portion so as to be set to an amount of light emission corresponding to a charging voltage level of said capacitor.

15. A control apparatus according to claim 13, wherein said control device causes light-emission timing of said light emitting portion to synchronize with a video signal of field unit.

16. A control apparatus according to claim 13, wherein said control device causes said light emitting portion to make light emission two times while causing light-emission timing of said light emitting portion to synchronize with a video signal of field unit.

* * * * *